United States Patent
Yamaguchi et al.

(10) Patent No.: US 6,676,396 B2
(45) Date of Patent: Jan. 13, 2004

(54) RESIN GUIDING DEVICE FOR INFLATION MOLDING APPARATUS

(75) Inventors: Takanari Yamaguchi, Tsukuba (JP); Motonobu Furuta, Chiba (JP); Tomokazu Takayanagi, Tsukuba (JP); Akio Morii, Ashikaga (JP); Noriyuki Ooshima, Ashikaga (JP)

(73) Assignee: Sumitomo Chemical Company, Limited, Osaka (JP)

( * ) Notice: Subject to any disclaimer, the term of this patent is extended or adjusted under 35 U.S.C. 154(b) by 408 days.

(21) Appl. No.: 09/732,937

(22) Filed: Dec. 11, 2000

(65) Prior Publication Data

US 2001/0008324 A1 Jul. 19, 2001

(30) Foreign Application Priority Data

Dec. 13, 1999 (JP) .......................... H11-353344
Dec. 13, 1999 (JP) .......................... H11-353353

(51) Int. Cl.$^7$ ............................................. B29C 47/90
(52) U.S. Cl. .................. 425/72.1; 264/209.5; 264/564; 425/326.1; 425/377; 425/392
(58) Field of Search .............................. 425/72.1, 326.1, 425/377, 392; 264/565, 564, 209.5

(56) References Cited

U.S. PATENT DOCUMENTS

| | | | | |
|---|---|---|---|---|
| 3,335,208 A | * | 8/1967 | Harris | .......................... 264/566 |
| 3,539,666 A | * | 11/1970 | Schirmer | .................... 425/72.1 |
| 3,649,143 A | * | 3/1972 | Papesh et al. | ........... 425/326.1 |
| 3,753,633 A | | 8/1973 | Van Kralingen | |
| 3,853,448 A | * | 12/1974 | Yazawa | .................... 425/326.1 |
| 4,462,953 A | | 7/1984 | Feil et al. | |
| 5,470,216 A | * | 11/1995 | Saito et al. | ................. 425/72.1 |

FOREIGN PATENT DOCUMENTS

| | | |
|---|---|---|
| DE | 2340259 A | 3/1975 |
| EP | 0273739 A | 7/1988 |
| GB | 834386 A | 5/1960 |
| JP | 7-186253 | 7/1995 |
| JP | 11-309775 | 11/1999 |

* cited by examiner

Primary Examiner—James P. Mackey
Assistant Examiner—Joseph Leyson
(74) Attorney, Agent, or Firm—Birch, Stewart, Kolasch & Birch, LLP

(57) ABSTRACT

Provided is a resin guiding device for an inflation molding apparatus, which guides a molten resin extruded and blown into a tubular resin from an inflation molding die, to a pair of take-up rolls, wherein the resin guiding device comprises a pair of guiding members placed between the inflation molding die and the pair of take-up rolls, and the guiding members respectively have curved contact faces which are in contact with the tubular resin where the curved contact faces are mutually outward curved, and each of the curved contact faces has a shape corresponding to a rein shape so as to fold the tubular resin into a flat shape.

15 Claims, 3 Drawing Sheets

(a)

(b)

(c)

RESIN GUIDING DEVICE FOR INFLATION MOLDING APPARATUS

BACKGROUND OF THE INVENTION

1. Field of the Invention

The present invention relates to a resin guiding device for an inflation molding apparatus, and for guiding an inflated molten resin which is extruded in a tubular shape from an inflation molding die, to a pair of take-up rolls, and also to a method of producing a film by using such an inflation molding apparatus.

2. Description of the Related Art

Usually, a production of a film by inflation molding technique is performed in the following manner. A molten resin is extruded in a tubular shape from an annular slit of an inflation molding die, and a gas such as the air is blown into the tubular resin to inflate the resin. The inflated tubular resin is folded into a flat shape by a pair of flat stabilizing plates placed to form a shape which is tapered as moving in the extrusion direction of the resin. The flattened resin is taken up by a pair of take-up rolls, and then wound up by a winding machine.

In such inflation molding, as the stabilizing plates for stabilizing the inflated tubular resin and folding the resin into a flat shape, used are plates which are not easily deformed, such as plates made of aluminum, stainless steel, or the like, or those into which an appropriate number of guiding rolls are incorporated in a direction perpendicular to the resin flow direction.

The above-described conventional techniques are very effective in the case where a general-purpose plastic which exhibits a relatively low modulus of elasticity and a relatively large tensile elongation during a process of cooling and solidifying, such as polyethylene (PE) or polypropylene (PP) is used as the resin. When a tubular resin is folded into a flat shape by a pair of stabilizing plates, wrinkles and the like may be sometimes caused in a film by inflation unevenness of the resin, or by the resistance difference between the resin and the stabilizing plates, etc. However, it is often that wrinkles and the like are not seen in a film of such a general-purpose plastic, which is obtained by flatly folding, taking up, and winding, because such a general-purpose plastic has plasticity even at a room temperature.

On the other hand, recently, expectations for an engineering plastic film which is excellent in heat resistance and has high modulus of elasticity, and hardly elongated are growing. A request for an inflation molding technique which can produce such a film at a relatively economical manner is expanding. As compared with such a general-purpose plastic, however, an engineering plastic exhibits a high modulus of elasticity and a small tensile elongation, that is, properties of hard, during a process of cooling and solidifying. When a resin is folded by flat stabilizing plate as in the conventional art, therefore, wrinkles, uneven thickness, and the like easily occur, whereby the appearance of a resulting film is often largely impaired.

It is an object of the invention to provide a resin guiding device for an inflation molding apparatus, and a film producing method which enable a film that has less wrinkles and thickness unevenness and that is excellent in appearance.

SUMMARY OF THE INVENTION

The object of the invention is to provide a resin guiding device for an inflation molding apparatus, which guides a molten resin extruded and blown into a tubular shaped resin from an inflation molding die, to a pair of take-up rolls, and characterized in that the resin guiding device comprises a pair of guiding members which are placed between the inflation molding die and the pair of take-up rolls. The guiding members respectively have curved contact faces which are in contact with the tubular resin. Said curved contact faces are mutually outward curved, and each of the curved contact faces has a shape corresponding to a rein shape so as to fold the tubular resin into a flat shape.

DETAILED DESCRIPTION OF THE INVENTION

Figure 1:
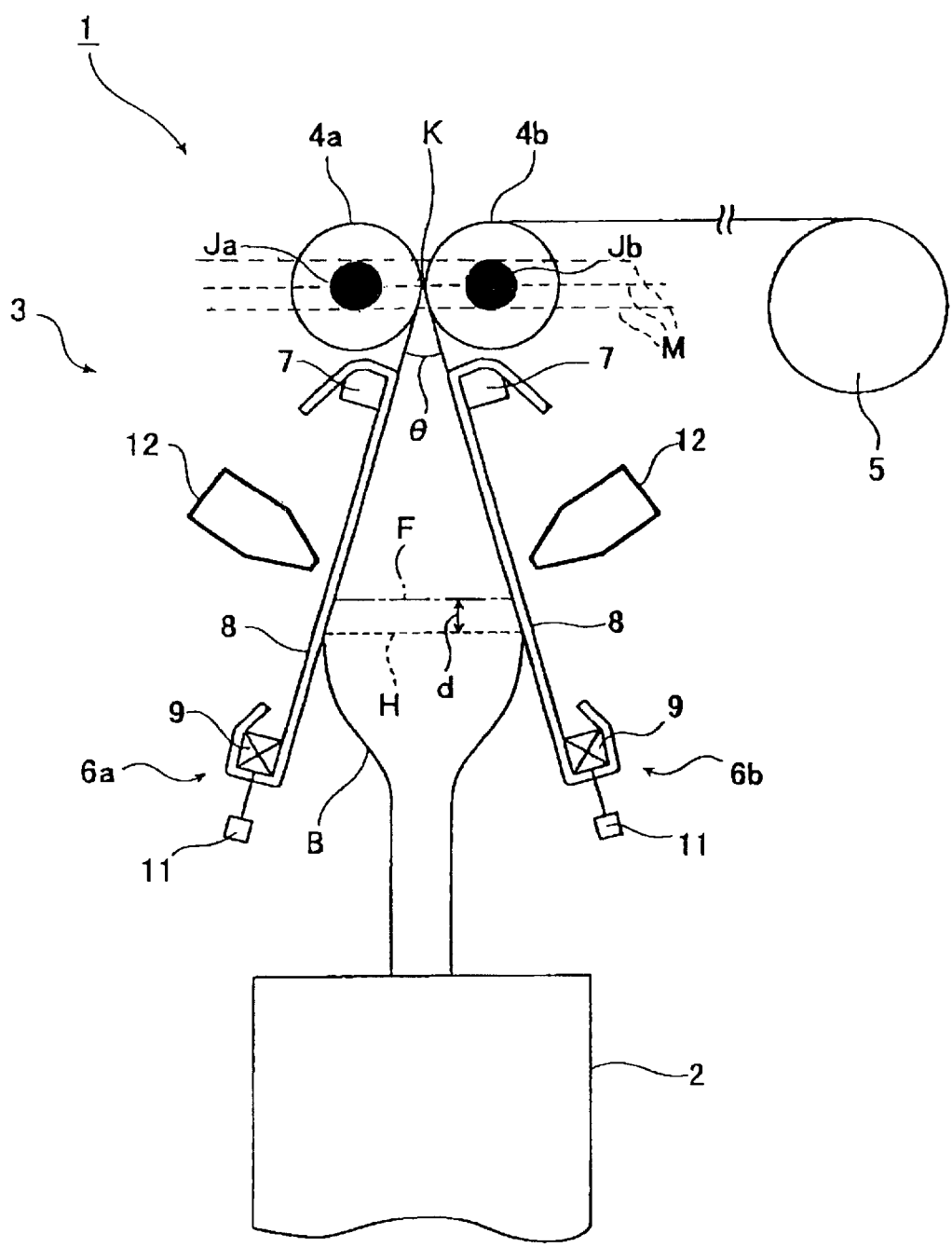
FIG. 1 is a diagram of an inflation molding apparatus including the resin guiding device of the invention.

In the invention, the inflated tubular resin which is extruded from the inflation molding die is folded into a flat shape along the curved contact faces which have a shape corresponding to the resin shape as described above. Therefore, the resistance generated by contact between the tubular resin and the guiding members is lowered, so that the tubular resin is smoothly folded and then fed to the pair of take-up rolls. Consequently, wrinkles which are formed in the resin are reduced. Accordingly, for example, when inflation formation of a film of a liquid crystalline polymer which is harder than a general-purpose polymer is conducted, it is possible to obtain a film stably that has less wrinkles, thickness unevenness, slacks, and is excellent in appearance.

Preferably, the pair of guiding members are disposed to cause the inflated tubular resin to be in contact with the curved contact faces before the resin reaches a frost line (the portion where the inflation of the resin is terminated) of the resin, and a level difference between a level at which the inflated tubular resin begins to be in contact with the curved contact faces and a level of the frost line is $1/30$ to $1/3$ of a circumference length of the tubular resin at the frost line. According to this configuration, the shape of the tubular resin is stabilized, and the resistance generated by contact between the tubular resin and the guiding members is lowered, whereby wrinkles which are formed in the film are further reduced.

The pair of guiding members are placed to form a shape which is further tapered as moving toward the pair of take-up rolls, and each of the pair of guiding members has a guide sheet having a hardness which allows the guide sheet to be deformed by a pressure of a gas for inflating the tubular resin. In this case, when the tubular resin is in contact with the guide sheets, the guide sheets wrap the tubular resin while the guide sheets are outward pressed by the resin so as to be deformed, and, under this state, the tubular resin is gradually folded into a flat shape by the guide sheets. As a result, the shapes of the curved contact faces can be surely made corresponding to the resin shape in a process of folding the tubular resin into a flat shape, by a relatively simple structure and in an easy manner.

In this case, preferably, the pair of guiding members are placed so that a line of intersection which is formed by extending opposing faces of the guide sheets toward the pair of take-up rolls is in a plane including axes of the pair of take-up rolls. According to this configuration, wrinkles which are formed in the resin between the pair of guiding members and the pair of take-up rolls can be reduced.

In the configuration, preferably, a sheet opening angle which is formed by an intersection in a case where the opposing faces of the guide sheets are extended toward the pair of take-up rolls is 5 to 60 deg. According to this configuration, the resistance generated when the tubular resin slides over the curved contact faces, and that generated when the tubular resin is folded by the guide sheets are lowered. Therefore, wrinkles which are formed in the resin are further reduced, the stability is enhanced, and the appearance of the film is further improved.

Preferably, the guide sheets are composed of a gas permeable member. In this case, during a process in which the tubular resin is folded into a flat shape by the guide sheets, the air appropriately enters through the guide sheets from the outside of the pair of guiding members, to cool the resin. Therefore, it is not required to provide means for performing forced cooling, such as airing means. According to this configuration, in inflation film formation using, for example, a liquid crystalline polymer which is more susceptible to be cooled and solidified than a general-purpose polymer, the resin is prevented from being excessively cooled. Therefore, wrinkles which are formed in the resin in an initial stage of the contact are removed away before solidification, and wrinkles and the like which are formed in the film are further reduced. In the case where airing means is not disposed, the production cost of an inflation molding apparatus can be reduced.

Preferably, the gas permeable members are members which have a gas permeability of 100 to 5,000 cc/sec. when, in a gas permeability test using Perm-Porometer according to ASTM F316, a circular test piece used in the test has a diameter of 38 mm and an air pressure is 0.02 kg/cm$^2$. According to this configuration, the tubular resin is optimally cooled and solidified, so that film formation can be performed more stably.

Preferably, the resin guiding device further comprises means, respectively disposed outside the pair of guiding members, for blowing a gas to the gas permeable members. According to this configuration, the tubular resin can be smoothly wrapped by the gas permeable members, and the efficiency of cooling the resin can be improved.

For example, each of the guiding members has a first frame which is placed in adjacent to the take-up rolls, and which elongates substantially in parallel with the longitudinal direction of the take-up rolls, and a part of the gas permeable member is fixed to the first frame.

In this case, preferably, a cooling passage is disposed in the first frame. When cooling water is passed through the cooling passage, the tubular resin can be cooled just before it is taken up by the take-up rolls, so that the efficiency of cooling the resin can be improved.

Preferably, each of the guiding members has a second frame which is placed to be closer to the inflation molding die than the first frame, and another part of the gas permeable member is fixed to the second frame in a windable and rewindable manner. According to this configuration, the vertical dimension of the gas permeable members can be changed. Therefore, inflation film formation can be performed at a high efficiency in accordance with the extrusion amount of the molten resin from the inflation molding die, cooling situations, etc.

It is preferable to compose each of the gas permeable members by one of a mesh, woven fabric, and nonwoven fabric, because the gas permeability of a certain degree can be ensured.

Preferably, the resin guiding device further comprises means, disposed in one of vertical end portions of each of the pair of guiding members, for adjusting a tension of a corresponding one of the guide sheets. According to this configuration, inflation unevenness of the tubular resin can be lowered, and wrinkles and the like which are formed in the film are further reduced.

In order to attain the object, the method of producing a film of the invention is characterized in that a film is produced by: extruding a molten resin in a tubular shaped resin from an inflation molding die; blowing a gas into the tubular resin to inflate the resin; folding the inflated tubular resin into a flat shape by the pair of guiding members of the resin guiding device; taking up the flatly folded tubular resin; and then winding up the taken-up resin.

When a film is produced by using the above-described resin guiding device in this way, the resistance generated when the tubular resin is in contact with the pair of guiding members is lowered, and the tubular resin can be smoothly folded. Therefore, it is possible to obtain a film that has less wrinkles, thickness unevenness, and the like and that is excellent in appearance.

As the resin, for example, a liquid crystalline polymer which exhibits optical anisotropy in a molten state is used. In this case, in view of molding workability and performance of an obtained film, it is preferable to use a liquid crystal polyester composition comprising (A) a liquid crystal polyester as a continuous phase, and (B) a copolymer having a functional group reactive with the liquid crystal polyester as a dispersed phase, as the liquid crystalline polymer. Alternatively, a composition obtained by melt-kneading (A) 56.0 to 99.9% by weight of liquid crystal polyester, and (B) 44.0 to 0.1% by weight of a copolymer having a functional group reactive with liquid crystal polyester may be used as the liquid crystalline polymer.

MODE FOR CARRYING OUT THE INVENTION

Hereinafter, a preferred embodiment of the resin guiding device and the method of producing a film according to the invention will be described with reference to the accompanying drawings.

Figure 2:
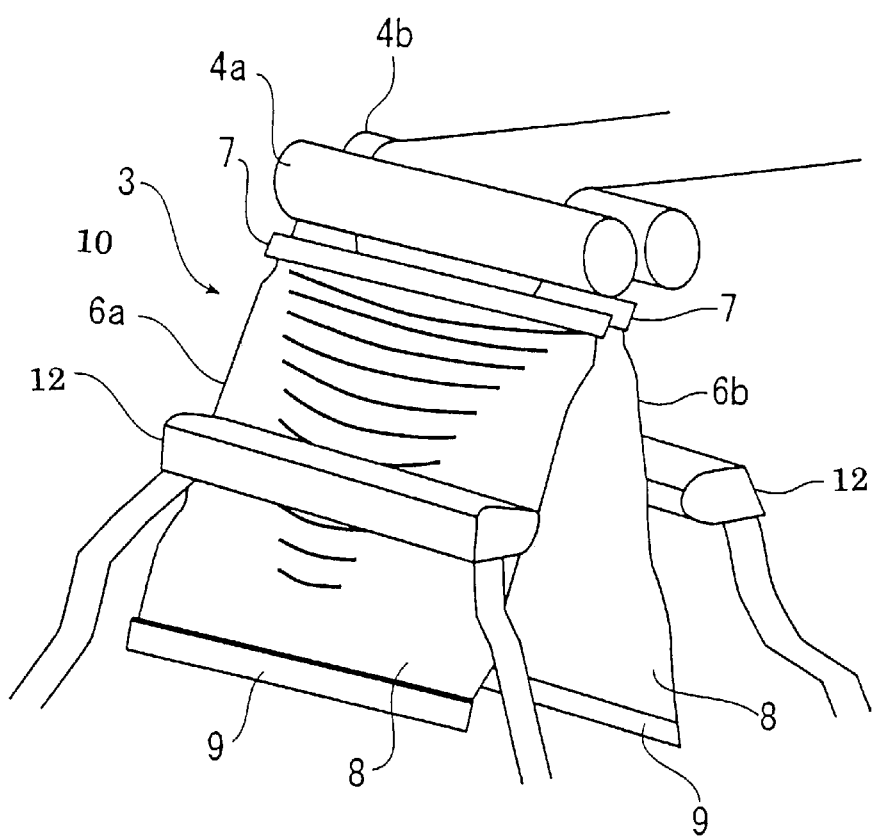
FIG. 2 is a perspective view showing the resin guiding device.
Figure 3:
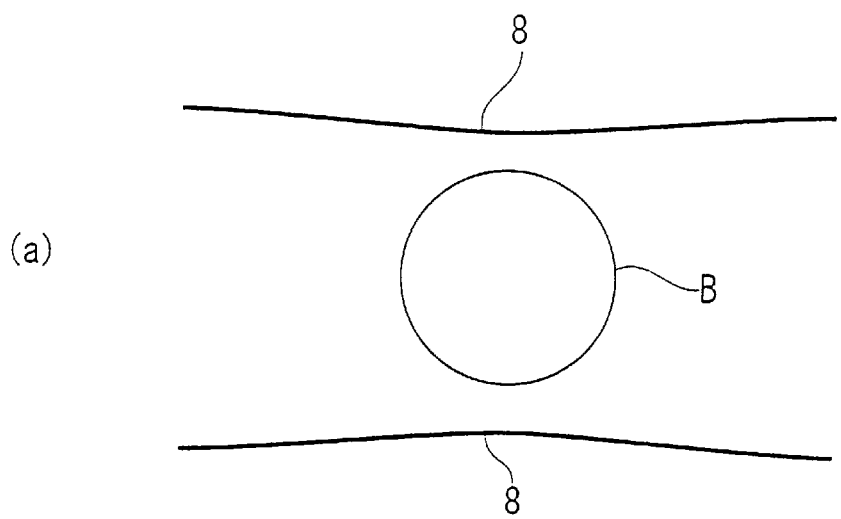
FIG. 3 is a view showing a state in which a bubble is folded into a flat shape by a pair of guiding members.
Figure 3:
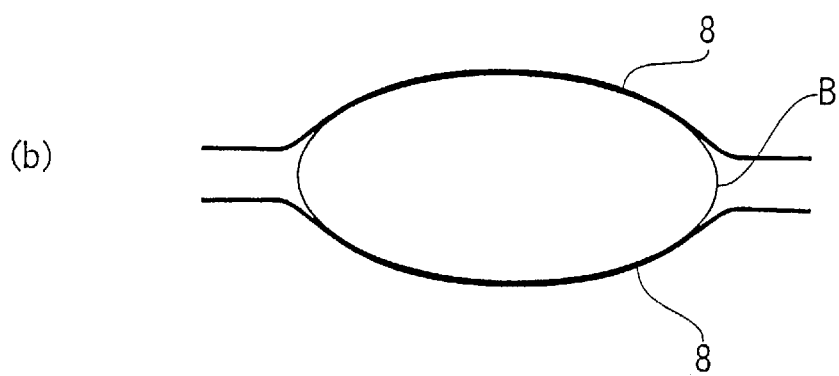
Figure 3:
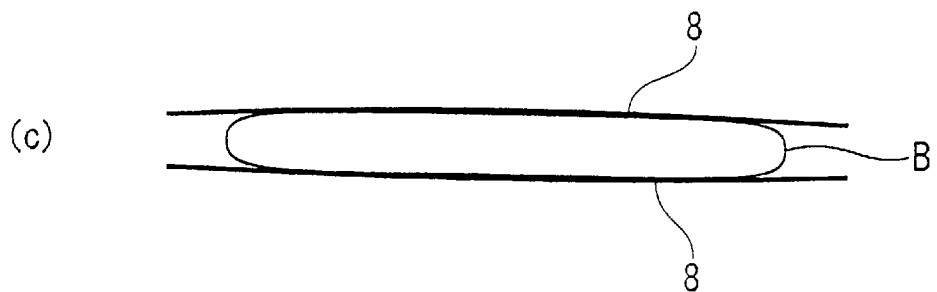

FIG. 1 is a diagram of an inflation molding apparatus including the resin guiding device of the invention. FIG. 2 is a perspective view showing the resin guiding device. FIG. 3 is a view showing a state in which a bubble is folded into a flat shape by a pair of guiding members. Referring to the figures, the inflation molding apparatus 1 comprises: an inflation molding die 2; the resin guiding device 3 which is disposed above the inflation molding die 2, and which flattens a molten resin (hereinafter, often referred to as bubble B) that is extruded in a tubular shape from the inflation molding die 2 and inflated, while cooling the resin; a pair of take-up rolls 4a and 4b which take up the bubble B (tubular film) which has been flattened by the resin guiding device 3; and a winding machine 5 which winds up a film sent from the take-up rolls 4a and 4b.

The resin guiding device 3 has a pair of guiding members 6a and 6b which are placed to form a shape that is further tapered as moving upward, and which fold the bubble B into a flat shape. The guiding members 6a and 6b have frames 7 and 9 which are placed in parallel with each other, and which elongate substantially in parallel with the longitudinal direction (axial direction) of the take-up rolls 4a and 4b, and guide sheets 8 bonded to the frames 7 and 9, respectively.

As the guide sheets 8, used are gas permeable members, for example, meshes which are composed of a metal, a resin, inorganic fibers, or the like, woven fabric such as woven glass fabric, or nonwoven fabric. The guide sheets 8 have a hardness which allows the guide sheets to be deformed by a pressure of a gas such as the air for inflating the bubble B, and form curved contact faces 10 (see FIG. 3) which are in contact with the bubble B under a state where the sheets are outward curved by the pressure of the gas. According to this configuration, the resistance generated by contact between the bubble B and the guide sheets 8 is lowered, so that wrinkles which are formed in the bubble B can be suppressed. This will be described later in detail.

The guide sheets 8 have also a function of cooling the bubble B by the air entering from the outside of the guiding members 6a and 6b, because of the gas permeability of the sheets themselves. In order to effectively cool and solidify the bubble B, it is preferable to use a member which has a gas permeability of 100 to 5,000 cc/sec. when, in a gas permeability test using Perm-Porometer according to ASTM F316, a circular test piece used in the test has a diameter of 38 mm and an air pressure is 0.02 kg/cm$^2$. According to this configuration, wrinkles which are formed in the bubble B can be further suppressed.

As the guide sheets 8, useful are a sputter sheet (gas permeability: 2,000 cc/sec.) which is woven glass fabric, p-aramid plain woven fabric (gas permeability: 1,500 cc/sec.), plain woven fabric of #100 mesh and made of stainless steel, etc.

The guide sheets are not restricted to gas permeable sheets, as far as they have a hardness which allows the guide sheets to be deformed by a pressure of a gas such as the air for inflating the bubble B.

The frame 7 which is positioned on the side of the take-up rolls 4a and 4b is composed of, for example, a metal pipe. In inflation molding, cooling water is introduced into the frame 7 so as to cool an upper portion of the bubble B.

Tension adjusting members 11 which enable the guide sheets 8 to be wound up and fed out, and which include a gear, a stopper, and the like are disposed in the frame 9 which is positioned on the side of the inflation molding die 2, so that the tension of each of the guide sheets 8 can be adjusted by changing the length of the guide sheet 8 in the vertical direction (the direction of extruding the resin). When the guide sheets 8 are stretched so as to form planer faces by the thus configured tension adjusting members 11, inflation unevenness of the bubble B can be reduced and wrinkles and the like which are formed in the bubble B can be further reduced.

The pair of thus configured guiding members 6a and 6b are placed so that the inflated bubble B is caused to be in contact with the guide sheets 8 before the bubble B reaches the frost line (the portion where the inflation of the resin is terminated) F. Preferably, the level difference d between the level H at which the inflated bubble B begins to be in contact with the guide sheets 8, and the level of the frost line F is set to be 1/30 to 1/3 of the circumference length of the bubble B at the frost line F, because, according to this configuration, the resistance generated in the contact can be lowered and the shape of the bubble B can be stabilized.

Preferably, the pair of guiding members 6a and 6b are disposed so that a line of intersection K (elongating in the direction perpendicular to the sheet of FIG. 1) which is formed by extending opposing faces of the guide sheets 8 toward the pair of take-up rolls 4a and 4b is in a plane M (extending in the direction perpendicular to the sheet of FIG. 1) including the axes Ja and Jb of the take-up rolls 4a and 4b. According to this configuration, wrinkles which are formed in the bubble B between the guiding member 6a and 6b and the take-up rolls 4a and 4b can be reduced. At this time, preferably, the pair of guiding members 6a and 6b are disposed so that the sheet opening angle θ which is formed by an intersection in the case where the opposing faces of the guide sheets 8 are extended toward the pair of take-up rolls 4a and 4b is 5 to 60 deg. According to this configuration, the resistance generated when the bubble B slides over the guide sheets 8, and that generated when the bubble B is folded by the guide sheets 8 can be further lowered.

Air blowers 12 which blow a gas such as the air to the guide sheets 8 are disposed outside the pair of guiding members 6a and 6b, respectively. Each of the air blowers 12 can blow the air or the like to the whole width direction of the corresponding guide sheet 8, and can be adjusted in volume and direction of the blown air. Alternatively, a plurality of air blowers may be disposed outside each of the pair of guiding members 6a and 6b.

For example, the guiding members 6a and 6b are suspended via arms (not shown) connected to the frame 7 from an upper support frame (not shown), and also the air blowers 12 are suspended via arms (not shown) from the support frame.

Next, a method of performing inflation film formation by using the inflation molding apparatus 1 including the thus configured resin guiding device 3 will be described.

As the resin, a liquid crystall polyester which exibits optical anisotropy in molten state is used in the present invention.

The liquid crystal polyester is a polyester called "thermotropic liquid crystal polymer".

More specifically, examples thereof include:

(1) those comprising a combination of an aromatic dicarboxylic acid, an aromatic diol, and an aromatic hydroxycarboxyic acid;

(2) those comprising a combination of different kinds of aromatic hydroxycarboxylic acids;

(3) those comprising a combination of an aromatic dicarboxylic acid and a nuclear-substituted diol; and (4) those obtainable by the reaction of a polyester such as polyethylene terephthalate with an aromatic hydroxycarboxylic acid;

and preferably those which form an anisotropic molten product at a temperature of 400° C. or lower. Further, in place of the aromatic dicarboxylic acid, the aromatic diol, or the aromatic hydroxycarboxylic acid, ester derivatives thereof can be used.

Examples of repeating units of the liquid crystal polyester include the following (1) repeating unit derived from aromatic dicarboxylic acid, (2) repeating unit derived from aromatic diol, and (3) repeating unit derived from aromatic hydroxycarboxylic acid, without being limited thereto.

(1) Repeating unit derived from aromatic dicarboxylic acid:

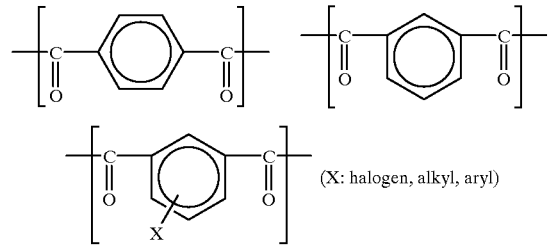

(X: halogen, alkyl, aryl)

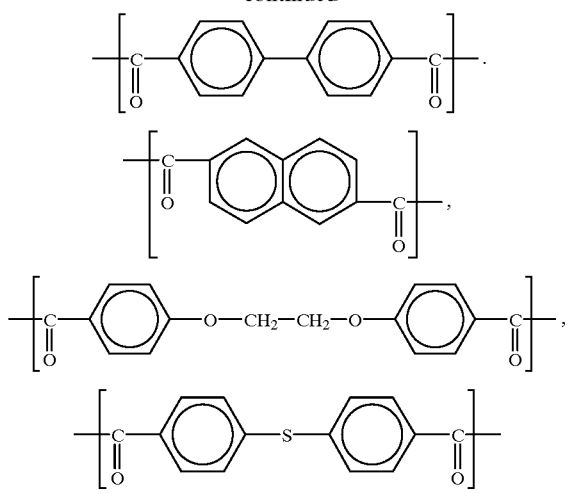

(2) Repeating unit derived from an aromatic diol:

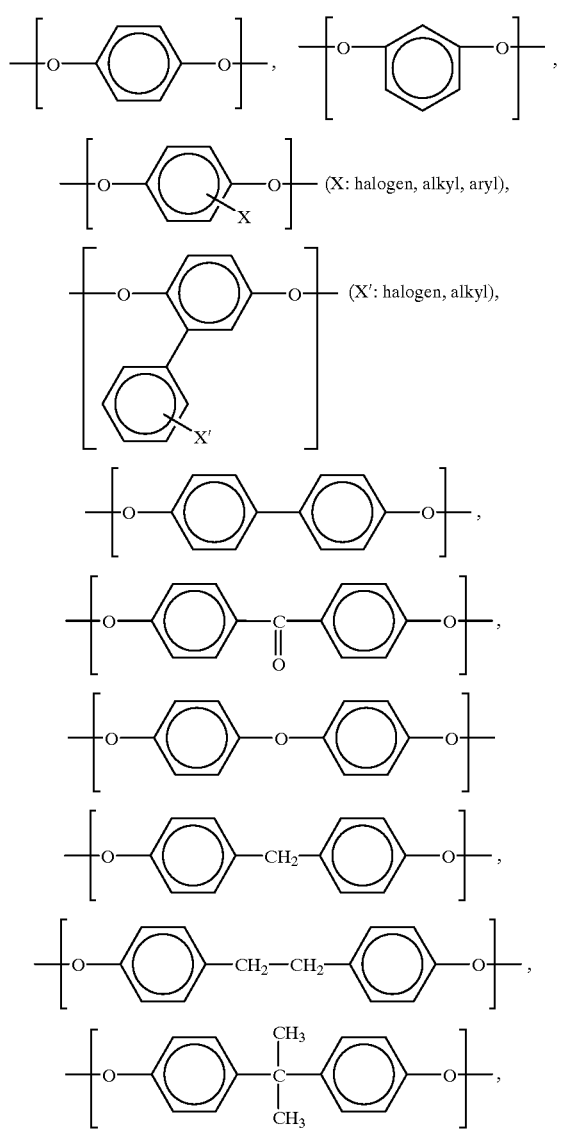

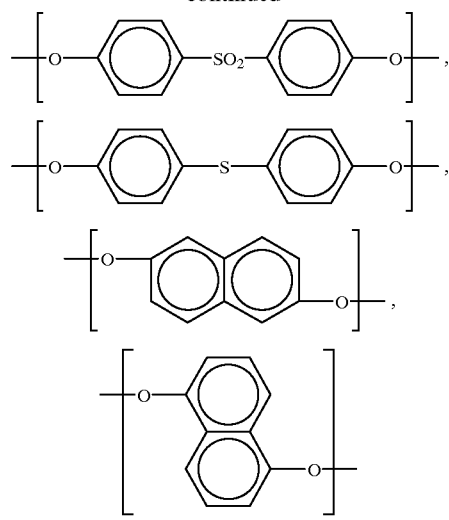

(3) Repeating unit derived from an aromatic hydroxycarboxylic acid:

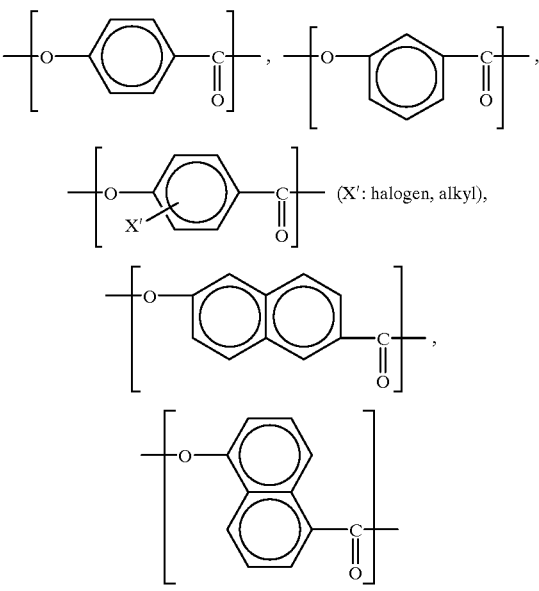

Liquid crystal polyesters including a repeating unit:

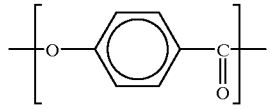

are particularly preferable in heat resistance, mechanical properties, and processability, and those including at least 30 mole % of the repeating unit are further preferable.

Specifically, combinations of the repeating units shown as the following (I)–(VI) are suitable.

(I)
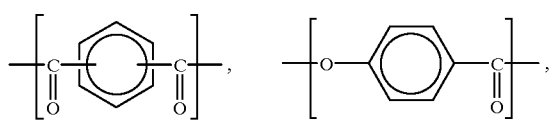

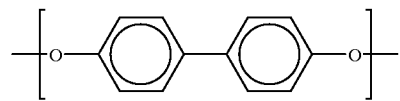

(II)
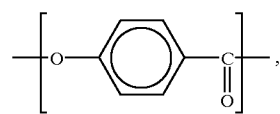

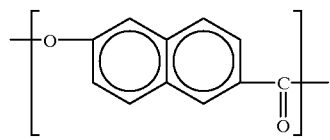

(III)
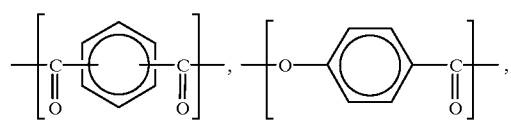

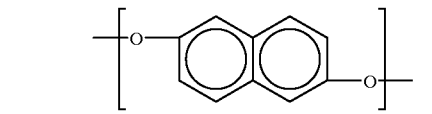

(IV)
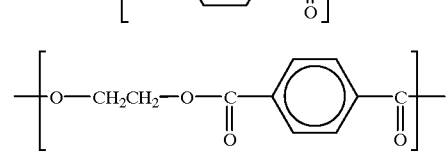

(V)
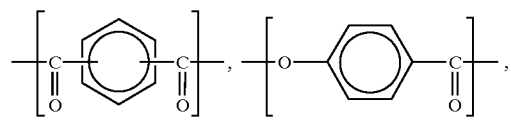

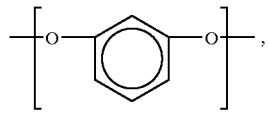

-continued
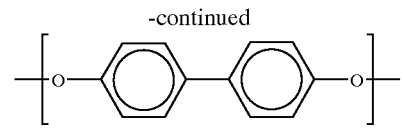

(VI)
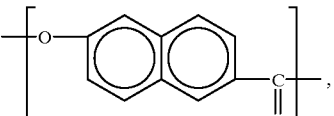

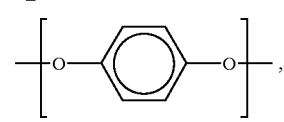

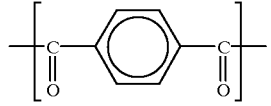

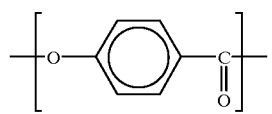

Production method of the above liquid crystal polyesters (I) to (VI) are disclosed in JP-B-47-47870, JP-B-63-3888, JP-B-63-3891, JP-B-56-18016, and JP-A-2-51523. Among these, combinations represented by (I), (II), and (IV) are preferable, and the combinations (I) and (II) are more preferable.

In the present invention, a liquid crystal polyester comprising: 30–80% by mole of repeating unit (a'); 0–10% by mole of repeating unit (b'); 10–25% by mole of repeating unit (c'); and 10–35% by mole of repeating unit (d'); is preferably used for the field where high heat resistance is required.

(a')
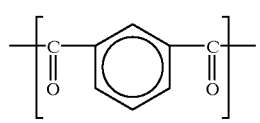

(b')
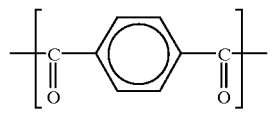

(c')
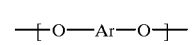

(d')

In the formula, Ar is a divalent aromatic group.

In the present invention, from standpoints such as an environmental problem, in the field required for easy abandonment, such as incineration after use, a liquid crystal polyester constituted with the combination of elements of only carbon, hydrogen and oxygen is used preferably, among the suitable combinations required for each fields exemplified so far.

The component (B) used for the above liquid crystal polyester resin composition is a copolymer having a functional group reactive with liquid crystal polyester. As such a functional group reactive with liquid crystal polyester, any functional groups can be used as long as it has reactivity with a liquid crystal polyester. Concretely, exemplified are an oxazolyl group, an epoxy group, an amino group, etc., and preferably an epoxy group. The epoxy group etc. may exist as a part of other functional groups, and as such an example, a glycidyl group is exemplified.

In the copolymer (B), as a method of introducing such a functional group into a copolymer, it is not limited especially and can be carry out by the well-known methods. For example,
It is possible to introduce a monomer having this functional group by copolymerization in a preparation stage of the copolymer. It is also possible to conduct a graft polymerization of a monomer having this functional group to a copolymer.

As the monomer having a functional group reactive with liquid crystal polyester, among them, as the monomer containing a glycidyl group, unsaturated glycidyl carboxylates and/or unsaturated glycidyl ethers are used preferably.

Specifically, as unsaturated glycidyl carboxylate, exemplified are: glycidyl acrylate, glycidyl methacrylate, itaconic acid diglycidyl ester, butene tri carboxylic acid triglycidyl ester, p-styrene glycidyl carboxylate, etc. As unsaturated glycidyl ether, exemplified are: vinyl glycidyl ether, allyl glycidyl ether, 2-methyl allyl glycidyl ether, methacryl glycidyl ether, styrene-p-glycidyl ether, etc.

Unsaturated glycidyl carboxylate is a compound suitably represented by the general formula

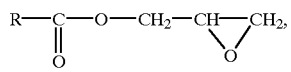

(in the formula, R is a hydrocarbon group of 2–13 carbons having an ethylenically unsaturated bond), and unsaturated glycidyl ether is a compound suitably represented by the general formula

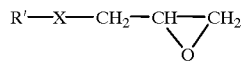

in the formula, R' is a hydrocarbon group of 2–18 carbons having an ethylenically unsaturated bond, and X is —CH$_2$— O— or

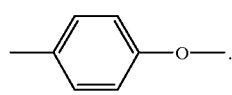

The above copolymer (B) having a functional group reactive with liquid crystal polyester, is suitably a copolymer having 0.1 to 30% by weight of a unsaturated glycidyl carboxylate unit and/or a unsaturated glycidyl ether unit.

Moreover, the above copolymer (B) having a functional group reactive with liquid crystal polyester may be a thermoplastic resin as well as a rubber, and it may be the mixture of a thermoplastic resin and a rubber. Preferable is a rubber which can afford excellent heat stability and flexibility to a molded article, such as a film or a sheet obtained using the liquid crystal polyester resin composition.

Further suitably, the above copolymer (B) having a functional group reactive with liquid crystal polyester is a copolymer having a heat of fusion of crystal of less than 3J/g.

Moreover, as the copolymer (B), Mooney viscosity is suitably 3–70, more suitably 3–30, and especially suitably 4–25. Here, Mooney viscosity means the value measured using using the large rotor at 100° C. according to JIS K6300. When it is outside the above ranges, heat stability or flexibility of the composition may deteriorate and it is not preferable.

Here, the rubber corresponds to a polymeric substance having rubber elasticity at room temperature according to New Edition Polymer Dictionary (edited by Society of Polymer Science, Japan, 1988, Asakura Shoten). Concrete examples include, natural rubber, butadiene polymer, butadiene-styrene copolymer (random copolymer, block copolymer (including SEBS rubber, SBS rubber, etc.), graft copolymer, etc.), or hydrogenated products thereof, isoprene polymer, chloro butadiene polymer, butadiene-acrylonitrile copolymer, isobutylene polymer, isobutylene-butadiene copolymer rubber, isobutylene-isoprene copolymer, acrylate-ethylene copolymer rubber, ethylene-propylene copolymer rubber, ethylene-butene copolymer rubber, ethylene-propylene-styrene copolymer rubber, styrene-isoprene copolymer rubber, styrene-butylene copolymer, styrene-ethylene-propylene copolymer rubber, perfluoro rubber, fluororubber, chloroprene rubber, butyl rubber, silicone rubber, ethylene-propylene-non-conjugated diene copolymer rubber, thiol rubber, vulcanized rubber, polyurethane rubber, polyether rubber (e.g., polypropylene oxide), epichlorohydrin rubber, polyester elastomer, polyamide elastomer, etc. Among them, acrylate-ethylene copolymer is used suitably and (meth)acrylate-ethylene copolymer rubber is still suitable. These rubber-like substances can be prepared by any methods (for example, emulsion polymerization method, solution polymerization method) and any catalyst (for example, peroxide, trialkyl aluminium, lithium halide, nickel type catalyst).

As a method of introducing such a functional group reactive with a liquid crystal polyester into a rubber, it is not limited especially and can be carry out by the well-known methods. For example, it is possible to introduce a monomer having the functional group by copolymerization in a preparation stage of the rubber. It is also possible to conduct a graft copolymerization of a monomer having the functional group to a rubber.

Concrete examples of the copolymer (B) having a functional group reactive with liquid crystal polyester, as a rubber having epoxy group, include a copolymer rubber of (meth)acrylate-ethylene-(unsaturated glycidyl carboxylate and/or unsaturated glycidyl ether).

Here, the (meth)acrylate is an ester obtained from an acrylic acid or methacrylic acid and an alcohol. As the alcohol, an alcohol having 1–8 carbons is preferable. Concrete examples of the (meth)acrylates include methyl acrylate, methyl methacrylate, n-butyl acrylate, n-butyl methacrylate, tert-butyl acrylate, tert-butyl methacrylate, 2-ethylhexyl acrylate, 2-ethylhexyl methacrylate, etc. The (meth)acrylates can be used alone or as a mixture of two or more thereof.

In the copolymer rubber of the present invention, the (meth)acrylate unit is suitably more than 40% by weight and less than 97% by weight, more suitably 45–70% by weight, the ethylene unit is suitably 3% by weight or more, and less 50% by weight, more suitably 10–49% by weight, and the unsaturated glycidyl ether unit and/or unsaturated glycidyl ether unit is suitably 0.1–30% by weight, more suitably 0.5–20% by weight.

In case of outside the above range, heat stability and mechanical properties of the obtained molded article, such as film or sheet may become insufficient, and it is not preferable.

The copolymer rubber can be prepared by usual methods, for example, bulk polymerization, emulsion polymerization, solution polymerization, etc. using a free radical initiator. Typical polymerization methods are those described in JP-B-46-45085, JP-B-61-127709, etc., and it can be prepared under the existence of a polymerization initiator which generates a free radical, at the pressure of more than 500 kg/cm², and the temperature of 40–300° C.

Examples of other rubbers which can be used as copolymer (B) include, an acryl rubber having a functional group reactive with liquid crystal polyester, and a block copolymer rubber of vinyl aromatic hydrocarbon compound-conjugated diene compound having a functional group reactive with liquid crystal polyester.

The acryl rubber here is suitably those having at least one monomer as a main component selected from the compound represented by the general formula (1)

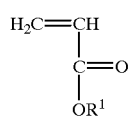

(in the formula, R1 is an alkyl group or a cyano alkyl group having 1–18 carbon atoms), the general formula (2)

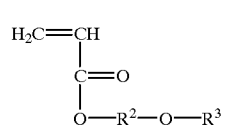

(in the formula, R2 is an alkylene group having 1–12 carbon atoms, R3 is an alkyl group having 1–12 carbon atoms), and the general formula (3)

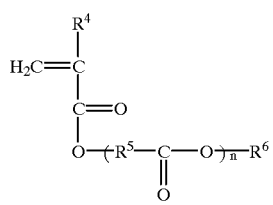

(in the formula, R4 is a hydrogen atom or methyl group, R5 is an alkylene group having 3–30 carbon atoms, R6 is an alkyl group or derivative thereof having 1–20 carbon atoms, and n is an integer of 1–20).

Concrete examples of the alkyl acrylate represented by the above general formula (1) include, for example, methyl acrylate, ethyl acrylate, propyl acrylate, butyl acrylate, pentyl acrylate, hexyl acrylate, octyl acrylate, 2-ethylhexyl acrylate, nonyl acrylate, decyl acrylate, dodecyl acrylate, cyanoethyl acrylate, etc.

Examples of the alkoxyalkyl acrylate represented by the above general formula (2) include, for example, methoxy ethyl acrylate, ethoxy ethyl acrylate, butoxy ethyl acrylate, ethoxy propyl acrylate, etc. These can be used alone or in combination of two or more, as a main component of the acryl rubber.

As a composition component of the acryl rubber, an unsaturated monomer which can be copolymerized with at least one monomer selected from the compounds represented by the above general formulas (1)–(3) can be used, according to requirements.

Examples of such unsaturated monomers include styrene, α-methyl styrene, acrylonitrile, halogenated styrene, methacrylonitrile, acryl amide, methacryl amide, vinyl naphthalene, N-methylol acrylamide, vinyl acetate, vinyl chloride, vinylidene chloride, benzyl acrylate, methacrylic acid, itaconic acid, fumaric acid, maleic acid, etc.

The suitable component ratio of the acryl rubber having a functional group reactive with liquid crystal polyester is: 40.0–99.9% by weight of one monomer selected at least from compounds represented by the above general formulas (1)–(3); 0.1–30.0% by weight of unsaturated glycidyl carboxylate and/or unsaturated glycidyl ether; 0.0–30.0% by weight of one monomer which can be copolymerized with the unsaturated monomers selected at least from the compound represented by the above general formula (1)–(3). If the component ratio of the acryl rubber is within the above range, heat resistance, impact resistance, and mold processing property of the composition are good, and it is preferable.

The preparation process of the acryl rubber is not especially limited, and well known polymerization method described, for example, in JP-A-59-113010, JP-A-62-64809, JP-A-3-160008, or WO 95/04764 can be used. It can be prepared under the existence of a radical initiator, by emulsion polymerization, suspension polymerization, solution polymerization, or the bulk polymerization.

Suitable examples of the block copolymer rubber of vinyl aromatic hydrocarbon compound-conjugated diene compound having the above functional group reactive with liquid crystal polyester include: a rubber which is obtained by epoxidization of a block copolymer comprising (a) sequence mainly consisting of vinyl aromatic hydrocarbon compound, and (b) sequence mainly consisting of conjugated diene compound; or a rubber which is obtained by epoxidization of a hydrogenated product of said block copolymer.

The block copolymer of vinyl aromatic hydrocarbon compound-conjugated diene compound or the hydrogenated product thereof can be prepared by the well-known methods, for example, as described in JP-B-40-23798, JP-A-59-133203, etc.

Examples of the aromatic hydrocarbon compound include, for example, styrene, vinyltoluene, divinylbenzene, α-methyl styrene, p-methyl styrene, vinyl naphthalene, etc. Among them, styrene is suitable. Examples of the conjugated diene compound include, for example, butadiene, isoprene, 1,3-pentadiene, 3-butyl-1,3-octadiene, etc. Butadiene and isoprene are suitable.

As a rubber used as copolymer (B), copolymer rubber of (meth)acrylate-ethylene-(unsaturated glycidylcarboxylate and/or unsaturated glycidylether) is suitably used.

A rubber used as copolymer (B) is vulcanized according to requirements, and it can be used as a vulcanized rubber. Vulcanization of the above copolymer rubber of (meth) acrylate-ethylene-(unsaturated glycidylcarboxylate and/or unsaturated glycidylether) is attained by using a polyfunctional organic carboxylic acid, a polyfunctional amine compound, an imidazole compound, etc., without being limited thereto.

As a concrete example of a copolymer having a functional group reactive with liquid crystal polyester (B) examples of a thermoplastic resin having epoxy group include an epoxy group containing ethylene copolymer comprising: (a) 50–99% by weight of ethylene unit, (b) 0.1–30% by weight of unsaturated glycidylcarboxylate unit and/or unsaturated glycidylether unit, preferably 0.5–20% by weight, and (c) 0–50% by weight of ethylenically unsaturated ester compound unit Examples of the ethylenically unsaturated ester compound (c) include vinyl ester of carboxylic acid and alkyl ester of $\alpha,\beta$-unsaturated carboxylic acid, etc. such as: vinyl acetate, vinyl propionate, methyl acrylate, ethyl acrylate, butyl acrylate, methyl methacrylate, ethyl methacrylate, and butyl methacrylate. Vinyl acetate, methyl acrylate and ethyl acrylate are especially preferable.

Concrete examples of the epoxy group containing ethylene copolymer include, for example, a copolymer comprising ethylene unit and glycidyl methacrylate unit, a copolymer comprising ethylene unit, glycidyl methacrylate unit and methyl acrylate unit, a copolymer comprising ethylene unit, glycidyl methacrylate unit and ethyl acrylate unit, and a copolymer comprising ethylene unit, glycidyl methacrylate unit and vinyl acetate unit etc.

Melt index (hereinafter referred to as "MFR". JIS K6760, at 190° C., 2.16 kg load) of the epoxy group containing ethylene copolymer is suitably 0.5–10 g/10 minutes, more preferably 2–50 g/10 minutes. When the melt index is more than 100 g/10 minutes, it is not preferable in respect to mechanical physical properties of the composition. When the melt index is less than 0.5 g/10 minutes, compatibility of component (A) with a liquid crystal polyester is inferior and it is not preferable.

The epoxy group containing ethylene copolymer has suitably a bending shear modulus of 10–1300 kg/cm$^2$, more suitably 20–1100 kg/cm$^2$. When the bending shear modulus is outside the range, mold processing property and mechanical properties of the composition may become inadequate.

The epoxy group containing ethylene copolymer is manufactured by high pressure radical polymerization method of copolymerizing usually an unsaturated epoxy compound and ethylene, under existence of a radical generating agent, at a pressure of 500 to 4000 atm and at 100–300° C., under existence or un-existing of a solvent and a chain transfer agent. It is manufactured also by a method of conducting molten graft copolymerization in an extruder, mixing an unsaturated epoxy compound and a radical generating agent with polyethylene.

The above liquid crystal polyester resin composition is suitably a resin composition comprising (A) a liquid crystal polyester as continuous phase, and (B) a copolymer having a functional group reactive with liquid crystal polyester as dispersed phase. When liquid crystal polyester is not continuous phase, gas barrier property, heat resistance, etc. of a film comprising the liquid crystal polyester resin composition may fall remarkably.

In the resin composition of the copolymer and the liquid crystal polyester having such a functional group, Although details of the mechanism are unknown it is thought that a reaction occurs between components (A) and component (B) in the composition, while component (A) forms continuous phase, component (B) disperses minutely, thus the moldability of the composition is improved.

One embodiment of the above liquid crystal polyester resin composition is a resin composition comprising (A) 56.0–99.9% by weight of a liquid crystal polyester, suitably 65.0–99.9% by weight, further suitably 70–98 by weight, (B) 44.0–0.1% by weight of a copolymer having a functional group reactive with liquid crystal polyester, suitably 35.0–0.1% by weight, further suitably 30–2% by weight. When component (A) is less than 56.0% by weight, the water vapor barrier property and heat resistance of the film obtained from the composition may fall. Moreover, when component (A) is more than 99.9% by weight, the mold processing property of the composition may fall, and the price will become expensive as well.

Well-known method can be used as the method of manufacturing such a liquid crystal polyester resin composition. For example, each component is mixed in a solution, and then evaporating the solvent, or precipitating it in the solvent. From a industrial standpoint, a method of melt-kneading each component of the above composition in molten state is suitable. For melt-kneading, currently generally used kneading machines such as an extruder having single or twin screws and various kinds of kneaders, can be used. High kneading machine having twin-screw is especially preferable. In melt-kneading. The setting temperature of the cylinder of kneading machine is suitably in the range of 200–360° C., more suitably 230–350° C.

In kneading, each component may be mixed uniformly by a machine such as a tumbling mixer or a Henschel mixer beforehand. A method can be used as well, where each component may be quantitatively supplied separately into a kneading machine, with omitting the previous mixing, if necessary.

Next, a method of performing inflation film formation on such liquid crystal polyester to produce a film will be specifically described.

First, liquid crystal polyester in a molten state is supplied from an extruder which is not shown, to the inflation molding die 2, and then extruded in a tubular shape in an upward direction from the annular slit of the inflation molding die 2. Thereafter, the air is blown into the tubular resin (bubble) B via an air introducing pipe (not shown) which is formed in the inflation molding die 2, thereby inflating the bubble B. The bubble B is guided to the pair of take-up rolls 4a and 4b while being folded into a flat shape by the pair of guiding members 6a and 6b.

At this time, before the bubble B makes contact with the guide sheets 8 of the guiding members 6a and 6b, the bubble B is inflated in a state where the tubular shape is maintained, as shown in FIG. 3(*a*). When the bubble B is in contact with the guide sheets 8 and begins to slide over the surfaces of the guide sheets 8, the guide sheets 8 are outward pressed by the internal pressure due to inflation of the bubble B. This cooperates with the pressure of the air which is blown from the air blowers 12 toward the guide sheets 8, to cause the guide sheets 8 to wrap the bubble B as shown in FIG. 3(*b*). Under this state, the bubble B is gradually folded into a flat shape. Namely, the pair of guide sheets 8 forcedly form the curved contact faces 10 (described above) which are in contact with the bubble B under a state where the sheets are mutually outward curved. This causes the curved contact faces 10 to inevitably have a shape corresponding to the bubble shape in the case where the bubble B is folded into a flat shape. Therefore, the resistance generated by contact between the bubble B and the guiding members 6a and 6b is lowered, so that the bubble B is smoothly folded and wrinkles which are formed in the bubble B are reduced.

When the bubble B is folded in this way, both the air which is naturally supplied, and the air which is blown from the air blowers 12 enter the gas permeable guide sheets 8. Consequently, the bubble B is gradually cooled while being folded, so that the time period of the state in which the resin has plasticity is prolonged. Even when wrinkles are formed at a small degree in the bubble B by the resistance generated by contact between the bubble B and the guide sheets 8, therefore, the wrinkles are substantially completely removed away before the bubble B is solidified in the upper portions of the guide sheets 8.

Thereafter, as shown in FIG. 3(*c*), the bubble B is approximately flattened under a state where the bubble is solidified, and then sent to the pair of take-up rolls 4*a* and 4*b*. The flattened bubble B (tubular film) is taken up by the pair of take-up rolls 4*a* and 4*b*, and then wound up by the winding machine 5.

As described above, in the embodiment, the gas permeable guide sheets 8 are disposed in the pair of guiding members 6*a* and 6*b*, and the curved contact faces 10 of a curvature corresponding to the bubble shape in the case where the bubble B is folded into a flat shape are formed in the guide sheets 8. Therefore, the bubble B is smoothly folded while being effectively cooled. As a result, it is possible to stably obtain a film that has less wrinkles, thickness unevenness, slacks, and the like and that is excellent in appearance.

Since members which can be deformed by a pressure of the air or the like for inflating the bubble B are used as the guide sheets 8, the curved contact faces 10 can be easily formed by a relatively simple structure.

In the above, a preferred embodiment of the invention has been described. It is a matter of course that the invention is not restricted to the embodiment. In the embodiment, the guide sheets 8 which can be deformed by the internal pressure caused by inflation of the bubble B are disposed in the guiding members 6*a* and 6*b*, thereby forming the curved contact faces 10 of a curvature corresponding to the bubble shape in the case where the bubble B is folded into a flat shape. The pair of guiding members are not particularly restricted to have such a structure. For example, the pair of guiding members may be composed by plates made of aluminum, stainless steel, or the like, and the curved contact faces may be previously formed by bending the plates so to coincide with the bubble shape in the case where the bubble B is folded into a flat shape.

In the embodiment, the resin guiding device 3 is positioned above the inflation molding die 2. The invention may be applied also to a resin guiding device in which the pair of guiding members 6*a* and 6*b* are placed below the inflation molding die 2 so as to form a shape which is further tapered as moving downward.

In the embodiment, a liquid crystalline polymer which exhibits optical anisotropy in a molten state is used as the resin. The resin is not particularly restricted to the material. A general-purpose plastic such as polyethylene or polypropylene may be used as the resin.

EXAMPLES

Hereinafter, the invention will be described with reference to examples. However, these examples are for presenting some embodiments, and thus the invention is not limited thereto.

(1) Liquid Crystal Polyester as Component (A)

(i) An amount of 8.3 kg (60 mole) of p-acetoxybenzoic acid, 2.49 kg (15 mole) of terephthalic acid, 0.83 kg (5 mole) of isophthalic acid, and 5.45 kg (20.2 mole) of 4,4'-diacetoxydiphenyl were placed in a polymerization vessel having comb-like agitating blades. The temperature in the vessel was raised while agitating under a nitrogen gas atmosphere, and polymerization was conducted for one hour at 330° C. The polymerization was conducted with vigorous agitation while acetic acid gas generated as a side product was liquefied by a cooling tube to be recovered or removed. Thereafter, the system was gradually cooled, and at 200° C. the obtained polymer was taken out from the system. The obtained polymer was pulverized with a hammer mill manufactured by Hosokawa Micron Co., Ltd. to have particles of 2.5 mm or smaller. Furthermore, by treating the particles in a rotary kiln in a nitrogen gas atmosphere for three hours at 280° C., wholly aromatic polyester particles of a flowing temperature of 324° C. were obtained.

A flowing temperature denotes a temperature at which a melt viscosity of 48,000 poise is obtained when a molten resin heated with a temperature rising rate of 4° C./minute is extruded from a nozzle having an inner diameter of 1 mm and a length of 10 mm under a load of 100 kgf/cm$^2$ measured with a Shimadzu flow tester type CFT-500 manufactured by Shimadzu Co., Ltd.

Hereinafter, the liquid crystal polyester is referred to as A-1. The polymer exhibited an optical anisotropy at 340° C. or higher under load. The repeating unit of the liquid crystal polyester A-1 is as shown below:

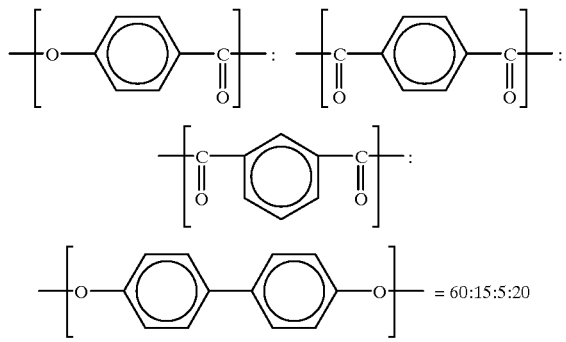

(ii) An amount of 16.6 kg (12.1 mole) of p-hydroxybenzoic acid, 8.4 kg (4.5 mole) of 6-hydroxy-2-naphthoic acid, and 18.6 kg (18.2 mole) of acetic anhydride were placed in a polymerization vessel having comb-like agitating blades. The temperature in the vessel was raised while agitating under a nitrogen gas atmosphere, and polymerization was conducted for one hour at 320° C. The polymerization was further conducted for one hour at 320° C. under a reduced pressure of 2.0 torr while discharging acetic acid generated as a side product to outside the system. Thereafter, the system was gradually cooled, and at 180° C. the obtained polymer was taken out from the system.

The obtained polymer was pulverized in the same manner as (i) above. Furthermore, by treating the particles in a rotary kiln in a nitrogen gas atmosphere for five hours at 240° C., wholly aromatic polyester particles of a flowing temperature of 270° C. were obtained.

Hereinafter, the liquid crystal polyester is referred to as A-2. The polymer exhibited an optical anisotropy at 280° C. or higher under load. The repeating unit of the liquid crystal polyester A-2 is as shown below:

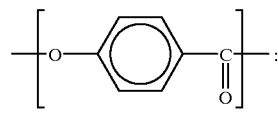

-continued

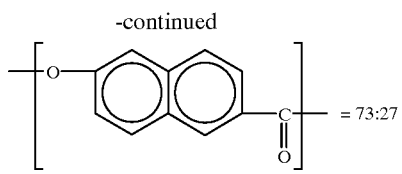
= 73:27

(2) Rubber as Component (B)

According to the method disclosed in Example 5 of JP-A-61–127709, a rubber comprising methyl acrylate/ethylene/glycidyl methacrylate=59.0/38.7/2.3 (weight ratio) having a Mooney viscosity of 15 was produced. The viscosity is a value measured by using a large rotor at 100° C. according to JIS K6300. Hereinafter, the rubber is referred to as B-1.

(3) Measurement of Gas Permeability

The air pressurized by 0.2 kg/cm$^2$ was applied to a circular test piece of a diameter of 38 mm, and an amount (cc) of the air passing through the test piece for one second was measured. The gas permeability test was performed by using Perm-Porometer according to ASTM F316.

(4) Reference Example 1

At a mixing ratio of A-1/B-1=85 parts by weight/15 parts by weight, melt kneading was conducted to obtain a composition by using TEX-30 type twin-screw extruder manufactured by Japan Steel Works, Co. Ltd., at a cylinder setting temperature of 335° C. and a number of screw revolutions of the screws of 250 rpm. The pellet of this composition exhibited an optical anisotropy at 330° C. or higher under load. Hereinafter the pellet is often referred to as P-1.

(5) Reference Example 2

At a mixing ratio of A-2/B-1=85 parts by weight/15 parts by weight, melt kneading was conducted to obtain a composition by using TEX-30 type twin-screw extruder manufactured by Japan Steel Works, Co. Ltd., at a cylinder setting temperature of 305° C. and a number of revolutions of the screws of 200 rpm. The pellet of this composition exhibited an optical anisotropy at 295° C. or higher under load. Hereinafter the pellet is often referred to as P-2.

(6) Example 1

A sufficient amount of the liquid crystal polyester (P-1) was supplied to a resin supply port of a screw extruder of 60 mm Φ. The resin was discharged from an inflation molding die at a number of revolutions of 120 rpm. The inflation molding die has a diameter of 100 mm, and the gap of the lip (resin flow path) of the die is 1 mm. The film formation was conducted while setting the temperature of the extruder to an average temperature of 340° C., and that of the inflation molding die to 345° C. The pair of guiding members of the resin guiding device have the following structure.

First, a set of two square frames of 1 m×1 m configured by square-section members of stainless steel having a section of 10 mm×10 mm was prepared. The frames were placed so that a shape which is tapered as moving along the extrusion direction of the resin is formed and one side of each of the frames elongates in the longitudinal direction of the take-up rolls. At this time, the gap between the frames in an upper end portion (end portion on the side of the take-up rolls) of the pair of guiding members is 70 mm. A line of intersection which is formed by extending opposing faces of the frames toward the take-up rolls is positioned in a plane including the axes of the take-up rolls, and the sheet opening angle which is formed by the intersection is about 20 deg. A square-section member (tension adjusting member) made of stainless steel and having a stopper which enables a guide sheet (described below) to be wound up and fed out is disposed outside a lower end portion of each of the square frame.

Then, woven glass fabric (a sputter sheet manufactured by G & J, Inc., gold alpha, gas permeability of 1,230 cc/sec) of a vertical length of 1.30 m was bonded to the inner side (opposing side) of each of the square frames. The woven fabric was thereafter stretched so as to be completely flat, and then fed out until the inflated tubular resin film was stabilized. In this case, the feeding distance was 4 cm. The woven glass fabric has a lateral length of 0.95 m and both the side edge portions of the woven glass fabric are not fixed to the square frame.

In this configuration, the woven glass fabric was deformed so as to be outward convex in a center portion while deforming the inflated tubular resin film, so as to wrap the inflated tubular resin. Under this state, the resin was folded into a flat shape.

The resin film was taken up under conditions of a blow ratio of 3.0 and a drawdown ratio of 30.5. At this time, the resin (bubble) which was inflated into a tubular shape was in contact with the guide sheets, in the range from a position lower than the frost line by about 10 cm to the upper portion, and substantially no swinging of the bubble in the lateral direction was observed, so that the end face of the wound film were almost flush. The width of the two-layer film which was obtained by folding into a flat shape was 470 mm, and the thickness of the film which was obtained by cutting away the end portions of 30 mm and peeling off was 11±1 μm. In the film, almost no wrinkles, slacks, and the like were observed.

(7) Example 2

A sufficient amount of the resin (P-2) was supplied to a resin supply port of a screw extruder of 60 mm Φ. The resin was discharged at a number of revolutions of 100 rpm. The example was conducted in the same manner as Example 1 except that p-aramid woven fabric (Twaron plain woven fabric manufactured by Nippon Aramid Corp., basis weight: 450 g/m$^2$, gas permeability: 1,500 cc/sec. at a pressure of 0.02 kg/cm$^2$) was used as the guide sheets of the pair of guiding members.

The resin film was taken up under conditions of a blow ratio of 2.6 and a drawdown ratio of 15.4. At this time, the inflated tubular resin was in contact with the guide sheets, in the range from a position lower than the frost line by about 10 cm to the upper portion. The width of the two-layer film which was obtained by folding into a flat shape was 410 mm, and the thickness of the film which was obtained by cutting away the end portions of 30 mm and peeling off was 25±3 μm. In the film, almost no wrinkles, slacks, and the like were observed.

(8) Example 3

A sufficient amount of the resin (P-2) was supplied to a resin supply port of a screw extruder of 60 mm Φ. The resin was discharged at a number of revolutions of 100 rpm. The film formation was conducted while setting the temperature of the extruder to an average temperature of 295° C., and that of the inflation molding die to 300° C. The example was conducted in the same manner as Example 1 except that a teflon sheet of a thickness of 100 μm was used as the guide sheets of the pair of guiding members.

The resin film was taken up under conditions of a blow ratio of 2.5 and a drawdown ratio of 20.0. At this time, the inflated tubular resin was in contact with the guide sheets, in the range from a position lower than the frost line by about 10 cm to the upper portion. The width of the two-layer film which was obtained by folding into a flat shape was 390 mm, and the thickness of the film which was obtained by cutting away the end portions of 30 mm and peeling off was 20±3 μm. In the film, almost no wrinkles, slacks, and the like were observed.

(9) Comparative Example 1

The film formation was conducted in the same manner as Example 1 except that the guiding members were structured so that an aluminum plate (thickness: 3 mm) of 1 m×1 m was bonded to a square frame and woven glass fabric (a sputter sheet manufactured by G & J, Inc., gold alpha) was bonded onto the plate (portion with which the resin is to be in contact), to obtain a film.

During the film formation, the bubble laterally swung in parallel with the faces of the aluminum plates, and the end faces of the wound film were not flush. In the obtained film, many wrinkles, slacks, and the like were observed. The thickness of the film which was obtained by peeling off the two-layer film that was obtained by folding into a flat shape was 11±3 μm and thickness unevenness was observed.

(10) Comparative Example 2

The film formation was conducted in the same manner as Example 3 except that the guiding members were structured so that an aluminum plate (thickness: 3 mm) of 1 m×1 m was bonded to a square frame and p-aramid woven fabric (Twaron plain woven fabric manufactured by Nippon Aramid Corp., basis weight: 450 gm$^2$) was bonded onto the plate (portion with which the resin is to be in contact), to obtain a film.

During the film formation, the bubble laterally swung in parallel with the face of the aluminum plate, and the end faces of the wound film were not flush. In the obtained film, many wrinkles, slacks, and the like were observed. The thickness of the film which was obtained by peeling off the two-layer film that was obtained by folding into a flat shape was 25±7 μm and thickness unevenness was observed.

(11) Example 4

A sufficient amount of the liquid crystal polyester (P-1) was supplied to a resin supply port of a screw extruder of 60 mm Φ. The resin was discharged from an inflation molding die at a number of revolutions of 120 rpm. The inflation molding die has a diameter of 100 mm, and the gap of the lip (resin flow path) of the die is 1 mm. The film formation was conducted while setting the temperature of the extruder to an average temperature of 340° C., and that of the inflation molding die to 345° C. The pair of guiding members of the resin guiding device have the following structure.

First, a set of two square frames of 1 m×1 m configured by square-section members of stainless steel having a section of 10 mm×10 mm was prepared. The square frames were placed so that a shape which is tapered as moving along the extrusion direction of the resin is formed and one side of each of the frames elongates in the longitudinal direction of the take-up rolls. At this time, the frame gap in upper end portions (end portions on the side of the take-up rolls) of the pair of square frames is 70 mm, and that in lower end portions (end portions on the side of the inflation molding die) is 400 mm. Then, woven glass fabric (microglass cloth YEM2103 manufactured by Nippon Sheet Glass Co., Ltd.) was bonded to the inner side (opposing side) of each of the square frames. The woven glass fabric has a gas permeability of 1,300 cc/sec.

The film which was flattened by the pair of guiding members was taken up under conditions of a blow ratio of 3.0 and a drawdown ratio of 30.5. At this time, even when a scroll of a length of 3,000 m was obtained, the film was stably produced with being little changed. The width of the two-layer film which was obtained by folding into a flat shape was 470 mm, and the thickness of the film which was obtained by cutting away the end portions of 50 mm and peeling off was 11±1 μm. In the film, almost no wrinkles, slacks, and the like were observed.

(12) Comparative Example 3

A pair of stabilizing plates each of which was formed by bonding an aluminum plate (thickness: 3 mm) of 1 m×1 m to the square frames, and then bonding the woven glass fabric (microglass cloth YEM2103 manufactured by Nippon Sheet Glass Co., Ltd.) onto the plates (portion with which the resin is to be in contact) were placed in the same manner as the embodiment, and film formation was conducted under the same conditions as those of the embodiment. In this case, the inflated bubble laterally swung in parallel with the faces of the stabilizing plates, and, after elapse of about ten minutes, the tubular film was broken in a direction perpendicular to the taking-up direction. Namely, the film formation was not conducted stably. The thickness of the film which was obtained by peeling off the two-layer film that was obtained by folding into a flat shape was 11±4 μm and thickness unevenness was observed.

According to the invention, a curved contact face having a shape corresponding to a rein shape in the case where the tubular resin is folded into a flat shape is disposed in each of a pair of guiding members, and hence the resistance generated by contact between the tubular resin and the guiding members is lowered, so that wrinkles which are formed in the resin are reduced. Therefore, a film of an excellent appearance can be stably produced.

What is claimed is:

1. A resin guiding device for an inflation molding apparatus, which guides a molten resin extruded and blown into a tubular resin from an inflation molding die, to a pair of take-up rolls, wherein said resin guiding device comprises a pair of guiding members placed between said inflation molding die and said pair of take-up rolls, and said guiding members respectively have curved contact faces which are in contact with the tubular resin and are mutually outward curved, and each of said curved contact faces has a shape corresponding to a rein shape so as to fold the tubular resin into a flat shape, wherein said pair of guiding members are placed to form a shape which is further tapered as moving toward said pair of take-up rolls, and each of said pair of guiding members has a guide sheet having a hardness which allows said guide sheet to be deformed by a pressure of a gas for inflating the tubular resin.

2. The resin guiding device according to claim 1, wherein said pair of guiding members are placed so that a line of intersection which is formed by extending opposing faces of said guide sheets toward said pair of take-up rolls is in a plane including axes of said pair of take-up rolls.

3. The resin guiding device according to claim 2, wherein a sheet opening angle which is formed by an intersection in a case where said opposing faces of said guide sheets are extended toward said pair of take-up rolls is 5 to 60 deg.

4. The resin guiding device according to claim 1, wherein said guide sheets are composed of a gas permeable member.

5. The resin guiding device according to claim 4, wherein said gas permeable members are members which have a gas permeability of 100 to 5,000 cc/sec. in a gas permeability test using Perm-Porometer according to ASTM F316, a circular test piece used in the test has a diameter of 38 mm and an air pressure is 0.02 kg/cm$^2$.

6. The resin guiding device according to claim 4, wherein said resin guiding device further comprises means, respectively disposed outside said pair of guiding members, for blowing a gas to said gas permeable members.

7. A The resin guiding device according to claim 1, wherein said device further comprises means, disposed in one of vertical end portions of each of said pair of guiding members, for adjusting a tension of a corresponding one of said guide sheets.

8. The resin guiding device according to claim 4, wherein each of said guiding members has a first frame which is placed in adjacent to said take-up rolls, and which elongates substantially in parallel with the longitudinal direction of said take-up rolls, and a part of said gas permeable member is fixed to said first frame.

9. The resin guiding device according to claim 8, wherein a cooling passage is disposed in said first frame.

10. The resin guiding device according to claim 8, wherein each of said guiding members has a second frame which is placed to be closer to said inflation molding die than said first frame, and another part of said gas permeable member is fixed to said second frame in a windable and rewindable manner.

11. The resin guiding device according to claim 4, wherein each of said gas permeable members is one of a mesh, woven fabric, and nonwoven fabric.

12. A method of producing a film in which a film is produced by: extruding a molten resin into a tubular resin from an inflation molding die; blowing a gas into the tubular resin to inflate the resin; guiding the inflated tubular resin by the resin guiding device according to claim 11; folding the inflated tubular resin into a flat shape by said pair of guiding members of the resin guiding device; taking up the flatly folded tubular resin; and then winding up the taken-up resin.

13. The method of producing a film according to claim 12, wherein a liquid crystalline polymer which exhibits optical anisotropy in a molten state is used as the resin.

14. The method of producing a film according to claim 13, wherein a liquid crystal polyester composition comprising (A) a liquid crystal polyester as a continuous phase, and (B) a copolymer having a functional group reactive with the liquid crystal polyester as a dispersed phase is used as the liquid crystalline polymer.

15. The method of producing a film according to claim 13, wherein a composition obtained by melt-kneading (A) 56.0 to 99.9% by weight of a liquid crystal polyester, and (B) 44.0 to 0.1% by weight of a copolymer having a functional group reactive with the liquid crystal polyester is used as the liquid crystalline polymer.

* * * * *